(12) United States Patent
Luskin et al.

(10) Patent No.: US 6,336,102 B1
(45) Date of Patent: *Jan. 1, 2002

(54) INVESTMENT FUND MANAGEMENT METHOD AND SYSTEM

(75) Inventors: Donald L. Luskin, Menlo Park; Lawrence G. Tint, Atherton, both of CA (US)

(73) Assignee: Wells Fargo Institutional Trust Company, N.A., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/511,633

(22) Filed: Aug. 7, 1995

Related U.S. Application Data

(63) Continuation of application No. 08/108,438, filed on Aug. 18, 1993, now abandoned.

(51) Int. Cl.$^7$ .............................................. G06F 15/60
(52) U.S. Cl. ............................................ 705/35; 705/1
(58) Field of Search ........................ 364/408; 395/235, 395/236, 237; 705/1, 35, 36, 37; 707/10, 100–104

(56) References Cited

U.S. PATENT DOCUMENTS

| | | | |
|---|---|---|---|
| 4,346,442 A | 8/1982 | Musmanno | 364/408 |
| 4,376,978 A | 3/1983 | Musmanno | 364/408 |
| 4,597,046 A | 6/1986 | Musmanno et al. | 364/408 |
| 4,642,768 A | 2/1987 | Roberts | 364/408 |
| 4,722,055 A | 1/1988 | Roberts | 364/408 |
| 4,742,457 A | 5/1988 | Leon et al. | 364/408 |
| 4,752,877 A | 6/1988 | Roberts et al. | 364/408 |
| 4,774,663 A | 9/1988 | Musmanno et al. | 364/408 |
| 4,953,085 A | * 8/1990 | Atkins | 364/408 |
| 5,101,353 A | * 3/1992 | Lupien et al. | 364/408 |
| 5,126,936 A | * 6/1992 | Champion et al. | 364/408 |
| 5,132,899 A | 7/1992 | Fox | 364/408 |
| 5,193,056 A | 3/1993 | Boes | 364/408 |

FOREIGN PATENT DOCUMENTS

| | | | |
|---|---|---|---|
| WO | WO 97/12336 | * | 4/1997 |

OTHER PUBLICATIONS

"Scottish Life Launches Retirement Investment Strategy", Money Marketing (MOM), Jan. 30, 1992, p. 10, Dialog file 583, Accession No. 04862713.*

Financial Services Week, (Aug. 20, 1990), "Planners Must Tailor Mutual Fund Mix to Suit Client", p. 23, 1990.*

Synthetics offer investors GIC alternative, Pensions & Investments, (May 11, 1992) p. 20.*

National Underwriter Life & Health, "CHART service aims to move savers money gradually into equities", (Aug. 9, 1993), apge 12.*

(List continued on next page.)

Primary Examiner—Frantzy Poinvil
(74) Attorney, Agent, or Firm—Fenwick & West LLP

(57) ABSTRACT

Method and system for management of an investment fund over a specified life, or time horizon $H_t$, for that fund. Generally, the system includes an investment fund $F_n$ having a fixed time horizon $H_t$ and an associated length to horizon $L_H$. The fund $F_n$ includes several investment assets $A_k$, which may be contained within investment portfolios $P_m$, which meet some criteria defining a predetermined asset characteristics. Cash is directed to selected ones of the assets, or portfolios, to establish an investment mix for the investment fund $F_n$. An important aspect of the method and system is adjustment of the investment mix in accordance with some criteria related to the time horizon $H_t$, preferably related to the diminishing length to horizon $L_H$, of the investment fund $F_n$. Thus, as the investment fund matures, the investment mix is changed.

25 Claims, 6 Drawing Sheets

OTHER PUBLICATIONS

John McMahan, "Balancing a Portfolio", Journal of Property Management, v 55, n 3, pp. 55–56, May 1990.*

Lisa Kleinholz, "Can Software Help You Get Rich?", Home Office Computing, v 8, n 8, pp. 30–31, Aug. 1990.*

UK: Databank—Renewed Interest in Deposit–Based Pensions as Equity Funds and Property Funds Fluctuate, Planned Savings, p. 40+, Nov. 27, 1990.*

"Moneyfor Mutual Funds", Direct Mail Packet, Moneyfor Management, Inc., New Jersey, May 8, 1989.

"Moneyfor Broker Dealer Owner Participation Executive Summary", Moneyfor Management, Inc., New Jersey, 1989.

* cited by examiner

INVESTMENT FUND MANAGEMENT METHOD AND SYSTEM

CROSS-REFERENCES TO RELATED APPLICATIONS

This application is a continuation of Prior application Ser. No. 08/108,438, filed on Aug. 18, 1993, now abandoned and which is incorporated by reference herein. This application is related to application Ser. No. 08/404,190, now issued as U.S. Pat. No. 5,812,987.

BACKGROUND OF THE INVENTION

The present invention relates generally to the field of business systems, and specifically relates to the field of investment fund management systems.

Long-term investment plans, such as pension plans, enable an investor to save for retirement. Pension plans typically are divided into two types: defined benefit plans; and defined contribution plans. A defined benefit plan involves a promise made by an employer of a lifetime definite benefit paid to the recipient after retirement. The employer funds the promise by investing in trust for the recipient. In a defined contribution plan, the employer and/or the employees contribute a definite amount of money to an investment plan. The benefit paid after retirement is uncertain; it is determined by the performance of the investment plan. 401K plans are an example of defined contribution plans.

In a typical defined contribution plan, the employer establishes a group of investment funds of specified characteristics, from which the employee may select. The group of funds typically is diverse, including funds specializing in bonds, stocks, money markets, and other asset classes, or combinations of asset classes. These funds may be collective investment funds or mutual funds, managed by the employer or by a third party.

An employee typically invests in a fund having characteristics matching his or her investment preferences, such as high-risk/high expected return or low-risk/low expected return. Over time, as the employee's investment preferences change, that employee may move his or her investment from one fund to another to reflect a change in preferences. But because the typical employee generally is not a trained investment expert, it is possible that sub-optimal selections may be made from among the funds, and that the selections are not optimally revised over time.

Many employees in defined contribution plans do not appreciate that investments with high-risk and high expected return—such as equity securities—may be appropriate even for risk averse investors if their time horizons are sufficiently far in the future, and if the investment is properly diversified. Thus, many employees tend to invest more conservatively than an investment expert would do under like circumstances. Because conservative investments generally have low returns over the long term, an unnecessarily risk-averse strategy may be expected to produce disappointing long-term performance.

Many employees in defined contribution plans do not possess sufficient expertise to select investment funds to match their risk preferences, even when their risk preferences are appropriate. As a result, investments may be selected that either expose an employee to unexpected risks, or expose the employee to unexpectedly low returns.

Finally, many employees in defined contribution plans do not possess sufficient expertise, or wish to devote sufficient time and attention, to appropriately revise their selection of funds as market conditions change, and as their own life circumstances change. If an employee neglects to revise his or her investments, or revises them inappropriately— perhaps due to emotions of fear or greed—that employee will be exposed to unexpected and inappropriate risks when market conditions change, or when his or her own life circumstances change.

The typical employee generally is unwilling to pay the costs to obtain private professional investment advice, or may be unaware that it is available. The typical employer generally is unwilling to provide advice to employees, either due to a lack of sufficient expertise, or due to an unwillingness to bear potential legal liabilities. Thus, there remains a need for a system and method for a typical employee in a defined contribution plan to make appropriate investments, to reflect appropriate long-term trade-offs of risk and return, to select investments that accurately reflect those trade-offs, and to revise those investments through time in response to changing market conditions and the employee's changing preferences.

SUMMARY OF THE INVENTION

The present invention relates to a method and system for managing one or more investment funds over a specified life of that fund. The data processing method of the present invention involves determining a time horizon $H_t$ associated with each investment fund $F_n$. The time horizon $H_t$ defines the expected date at which cash may need to be withdrawn from the fund and has an associated parameter $L_H$ representative of the length of time remaining between the present and the time horizon $H_t$. A plurality of investment assets are stored, together with information regarding each asset. These assets may be maintained within portfolios, each portfolio having a predetermined characteristic, thus the compilation of associated assets may reflect or establish the portfolio characteristic.

Cash initially is directed to selected ones of the assets or portfolios, to establish an investment mix. The investment mix is adjusted at periodic intervals in accordance with some criteria that is related to the diminishing length to time horizon $L_H$. The criteria may include a change in risk tolerance $R_I$, as a function of the remaining length to time horizon $L_H$, associated with each fund. Typically, the $R_I$ value decreases as the fund approaches the time horizon $H_t$. The criteria may include other processes or rates that are keyed to the time horizon of the fund.

The assets or portfolios included in each investment fund may be correlated to the fund based on factors in addition to $L_H$ and $H_t$, such as initial risk tolerance $R_I$, and/or some predetermined investment criteria $L_I$. The predetermined investment criteria $L_I$ may include such criteria as invest only in equity securities, diversify across a minimum number of asset classes, invest a percentage in money market instruments, and the like. In addition, individual portfolio characteristics may be based on several criteria, including expected volatility of the investment assets, expected responsiveness of the investment assets to market conditions, and expected return on the investment assets.

The present invention also is directed to a data processing system that corresponds to and performs the above described method. The invention is described in further detail in the following drawings and detailed description.

DETAILED DESCRIPTION OF THE PREFERRED EMBODIMENT

The present invention is a system and method for managing investment funds wherein each fund has a fixed time horizon $H_t$ and a diminishing length to horizon $L_H$. That is, the fund is managed by manipulating the investment mix of the fund in accordance with some criteria related to the diminishing length to horizon $L_H$ of the fund.

Generally, the method includes establishing an investment fund $F_n$ with a fixed time horizon $H_t$ and a diminishing length to horizon $L_H$. A relationship is established between at least one investment asset and the fund in accordance with a first set of criteria. One or more investment assets may be contained in a portfolio, which portfolio may be in some relationship with the fund. Cash may be directed to selected ones of the assets or portfolios to establish an investment mix for the investment fund. An important aspect of the invention is adjustment of the investment mix in accordance with some criteria related to the diminishing length to horizon $L_H$ of the investment fund $F_n$. Thus, as the investment fund matures, the investment mix is changed within the fund.

One exemplary manner in which the investment mix may change over the life of the fund is to change the distribution of new cash across the portfolios as such cash is invested in the fund or otherwise becomes available. Another manner is to change the asset or portfolio mix by exchanging assets or portfolios having one type of characteristic for assets or portfolios having a different type of characteristic. Typically, the investment strategy of an investment fund will become more conservative as it approaches maturity and the distribution of cash among the assets or the mix of portfolios reflects that change in the fund.

Figure 1:
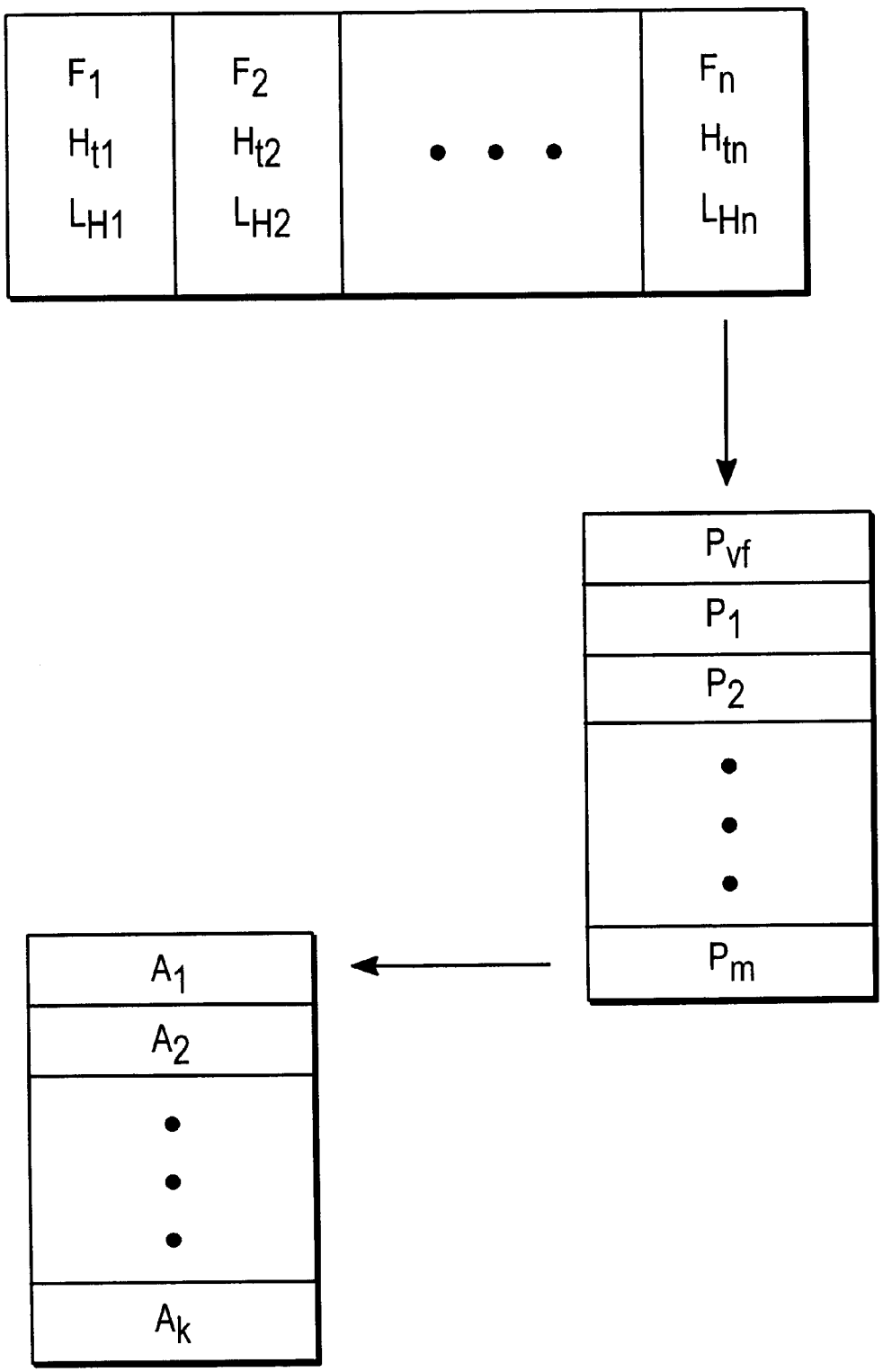
FIG. 1 depicts an exemplary investment fund structure embodying the present invention.

FIG. 1 graphically depicts an exemplary investment fund structure embodying the present invention. As shown, a plurality of investment funds $F_n$ are made available to individual investors. Each fund has an associated time horizon $H_t$, which indicates the date that the individual investor anticipates receiving money from the fund. The time horizon $H_t$ preferably is expressed in terms of a specific calendar date for maturity. Also associated with each fund $F_n$ is a length to horizon $L_H$ which represents the remaining time between the present and the time horizon $H_t$.

In an alternative embodiment, each fund $F_n$ also may have an associated risk tolerance value $R_t$, representative of whether the individual investor generally has a conservative or aggressive investment strategy. In another embodiment, an individual investor may impose other constraints for a particular fund, such as designation of allowable investments. For example, an investor may designate that the fund should consist only of domestic investments, or the fund should contain a predominant portion of portfolios directed to a specified technology or industry. In this manner, some funds of a specific time horizon $H_t$ may be established which are tailored in accordance with investor-specified attributes.

A relationship may be established between one or more investment portfolios $P_m$ and each investment fund $F_n$. The portfolio $P_m$ has an associated portfolio characteristic, or parameter, that may be predetermined either by the fund manager or by the individual investor. The portfolio characteristic typically is determined by or defines the type of assets constituting the portfolio. These assets may be characterized by such factors as the expected volatility of the investments, the expected responsiveness to market conditions, and expected return on the investments. Thus, an investment fund $F_n$ having a particular time horizon $H_t$ typically consists of several portfolios, each portfolio having a different characteristic. Alternatively, a relationship is established between one or more investment asset $A_k$, without the use of a portfolio. In that embodiment, each investment asset $A_k$ is handled in a manner similar to a portfolio $P_m$.

The portfolios $P_m$ of FIG. 1 may each consist of one or more investment asset $A_k$, or an asset mix, each representing a major asset class. These assets may include securities, such as stocks, bonds, and the like and may be combined in a manner that achieves the predetermined portfolio characteristic.

Figure 2:
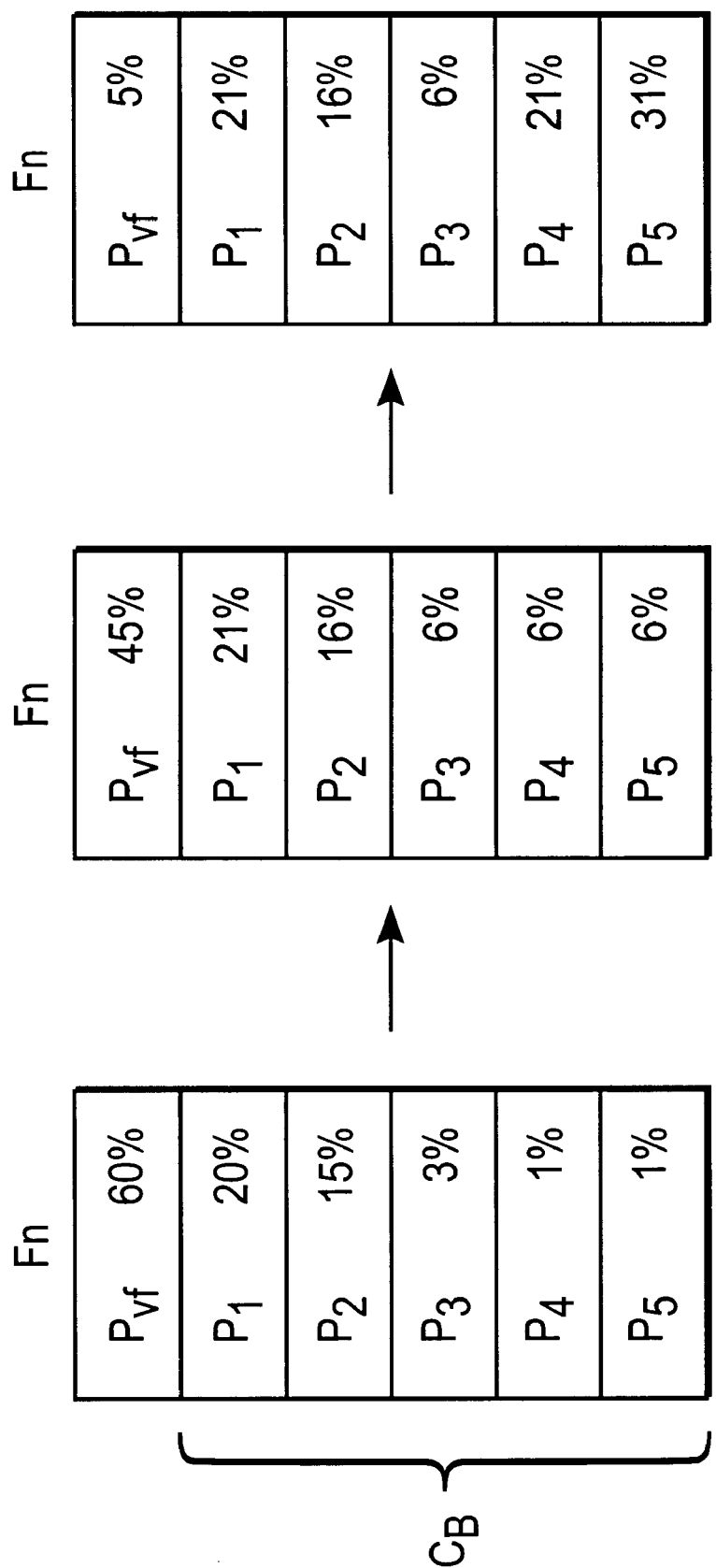
FIG. 2 depicts a shift in distribution of cash and/or other assets among the portfolios of an exemplary fund, over the life of the fund, in accordance with the present invention.

In one embodiment, and as shown in FIG. 2, each fund $F_n$ may include a portion known as present value of future cash flow $P_{vf}$. This portion represents a "phantom asset", or the total value of all future cash flows that are expected to be received for the fund $F_n$. In that illustrated embodiment, the fund $F_n$ has a current balance $C_B$ representative of the current value of the portfolios ($P_1$–$P_5$), including any cash available for investing. Available cash is removed from the $P_{vf}$ as it becomes available for investing in the portfolios of the particular fund $F_n$.

An important aspect of the present invention is maintaining a total fund balance, including $P_{vf}$ and $C_B$, of a particular fund, while changing the investment mix of that fund over the time horizon for that fund. One way in which the present system may administer the investment funds, each fund having a fixed time horizon, is to adjust the investment mix in accordance with some identified criteria.

In one embodiment of the invention, and as depicted in FIG. 2, the investment mix is adjusted by adjusting the percentage of available cash distributed among the portfolios $P_m$ in each fund $F_n$. As shown, cash initially is invested in the portfolios $P_1$–$P_5$ in accordance with a certain percentage. In the illustrated embodiment, $P_1$ has a relatively high-risk characteristic, whereas $P_5$ has a relatively low-risk characteristic. While the fund is young, i.e., the $P_{vf}$ (60%) is greater than the cash balance $C_B$ (40%), the individual portfolios have a greater relative percentage of cash invested in the higher-risk portfolios $P_1$ and $P_2$. Over the maturity of the fund, the cash is distributed among the portfolios such that near the time horizon for the fund, the portfolios have a greater relative percentage of value invested in the lower-risk portfolios $P_4$ and $P_5$.

In a preferred embodiment, the change in distribution of available cash may be a function of not only length to horizon $L_H$ but also of risk tolerance $R_t$, as previously described, associated with the particular fund. Other processes that consider the time horizon of the fund may be used in conjunction with the present system.

In another embodiment, the portfolio mix or asset mix for a given fund is adjusted as a function of the length to horizon $L_H$ by exchanging individual ones of the portfolios $P_m$ or investment assets $A_k$ for portfolios or investment assets having different characteristics. Typically the exchange is between portfolios or assets having higher-risk characteristics for ones having lower-risk characteristics. As with the illustrated embodiment of FIG. 2, these changes may be made as some function of the time horizon and risk tolerance $R_I$, depending on the particular system.

Figure 3:
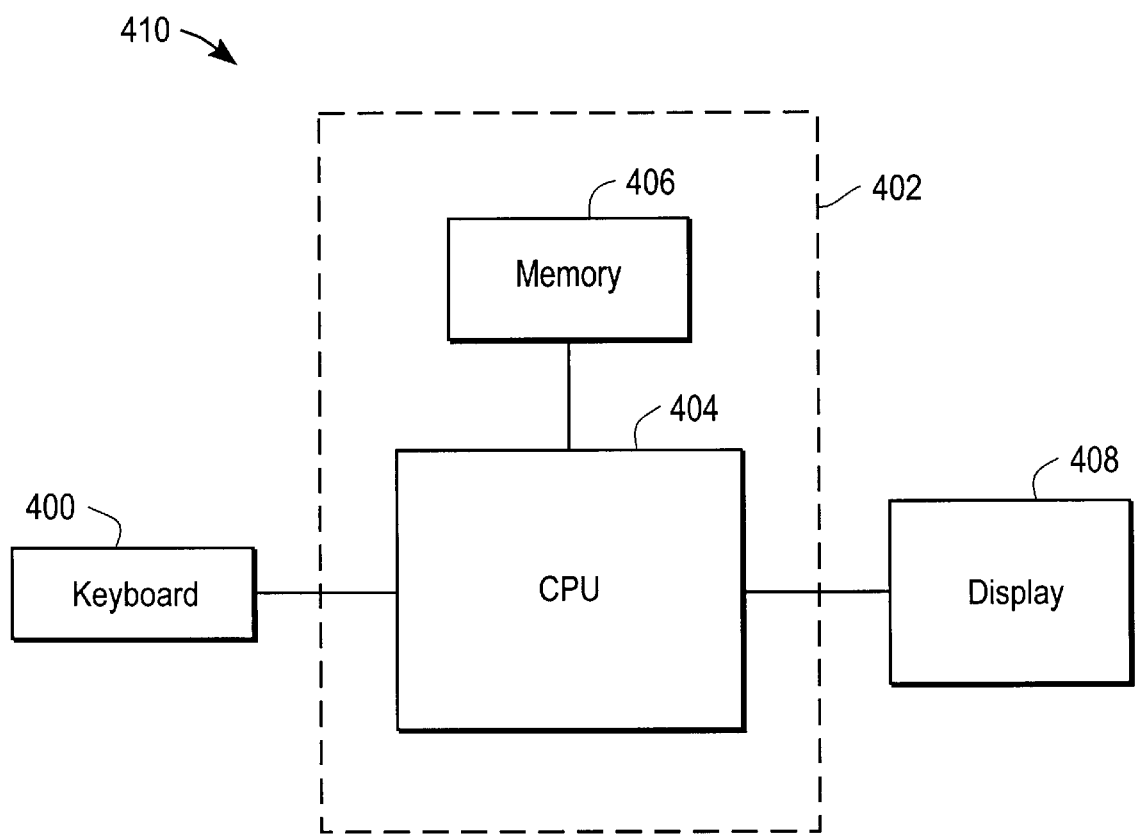
FIG. 3 depicts a block diagram of an exemplary data processing system embodying the present invention.

The hardware environment of the present system is depicted generally in FIG. 3. As shown, the system 410 includes an input device 400, such as a keyboard, in communication with a computer 402, including a processor 404 and at least one memory device 406. The elements of the present system 410 may be embodied in one or more processors 404, one or more devices that constitute the processor 404, or any other standard hardware devices commercially available. The system 410 also may include a display device 408 for generating a display of one or more of the outputs of the present system.

Figure 4:
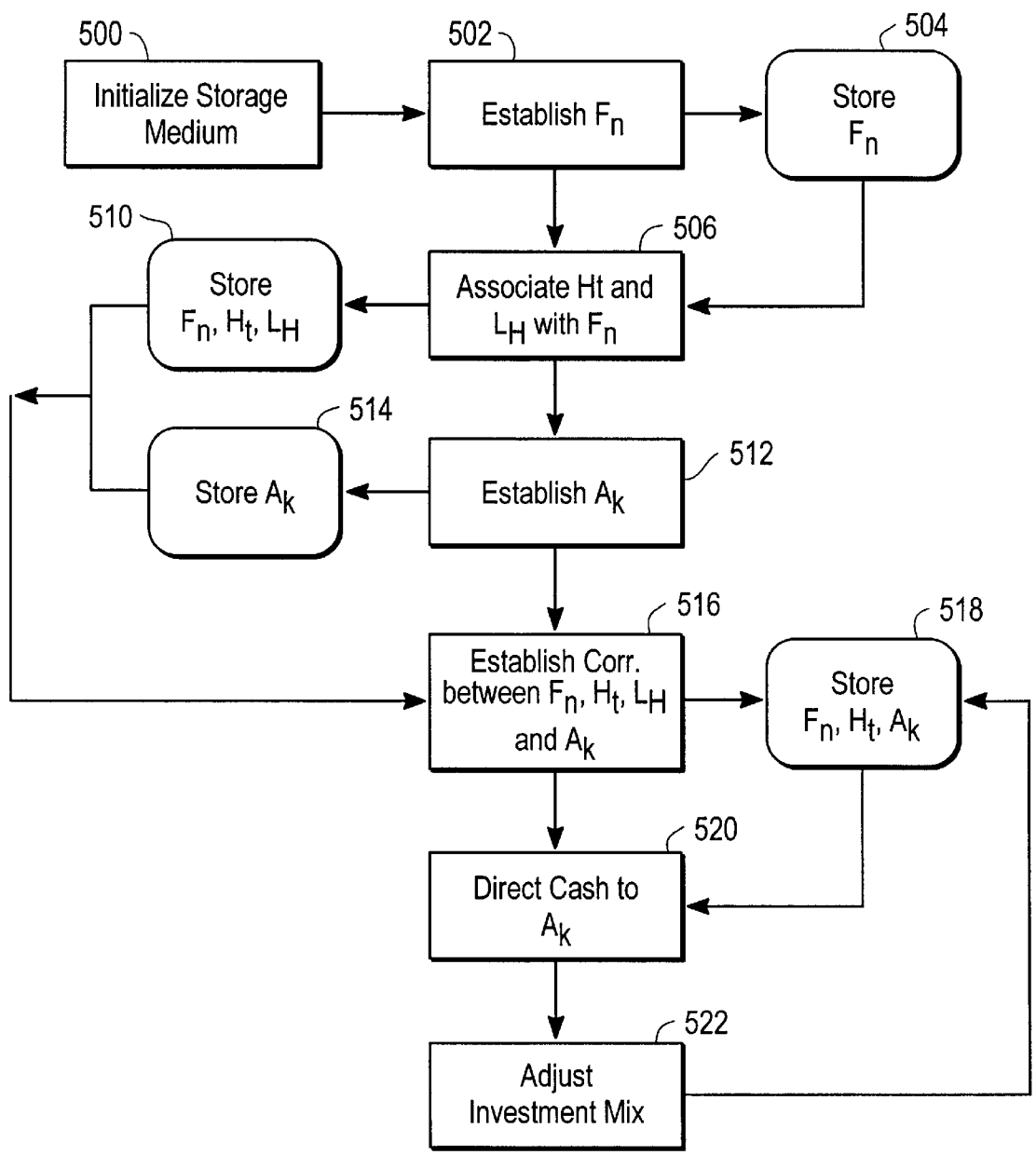
FIG. 4 depicts a flow chart of an embodiment of the present invention.

FIG. 4 depicts a flow chart of one embodiment of the present system. In the illustrated system, the storage medium 406 is initialized 500 by the processor 404 or by some other device in the computer 402. One or more investment funds $F_n$ are established 502 by the processor 404 and stored 504 in the storage medium 406. A time horizon $H_t$ and a length to horizon $L_H$ are associated 506 with each of the stored investment funds $F_n$, and the data $F_n H_t L_H$ is stored 510 in the storage medium 406. At the same time, or at a separate time, one or more investment asset $A_k$ may be established 512 and stored 514 on the storage medium. Alternatively, step 512 may include establishing a portfolio $P_m$ having one or more assets $A_k$.

The processor 402 establishes 516 a correlation between the stored $F_n H_t L_H$ data and the stored $A_k$ or $P_m$ data, and that correlated data is stored 518 in the storage medium. The processor 402 directs 520 available cash funds to the investment assets $A_k$ or portfolios $P_m$ associated with each fund $F_n$ and according to the length to horizon $L_H$ associated with each fund $F_n$, as described in detail above. The initial distribution 520 of cash among the investment assets $A_k$ or portfolios $P_m$ establishes the investment mix of each fund $F_n$. It is this investment mix that is adjusted 522 in accordance with some predetermined criteria, as described in further detail below, which criteria also is a function of the length to horizon $L_H$ associated with the fund $F_n$.

In one embodiment of the present invention, as described above, the system 410 includes a single storage medium 406 that is used to store the output of each of the elements of the system. In alternative embodiments, the system 410 may include a plurality of storage media, each of which may be used to store the output generated by different ones of the elements. Thus, reference to a storage medium includes the same or different storage media for purposes of the present invention.

In a preferred embodiment, the criteria by which the investment mix is adjusted 522 is a rate of risk tolerance $R_I$ that is related to the investment fund $F_n$ as a function of the length to horizon $L_H$ associated with that fund $F_n$.

There may be a correlation between the expected risk of an investment and the expected return on investment. By associating the time horizon $H_t$ with a risk indicator, such as $R_I$, it may be possible to decrease the amount of risk in investments over the life of a particular fund. For example, a fund $F_1$ that has an $H_t$ of 40 years may have an initial investment mix that has high expected risk because the investor has high risk tolerance $R_I$. Conversely, a fund F2 may have an associated $H_t$ of 10, in which the $R_I$ is quite low, leading to conservative investment mix.

Figure 5A:
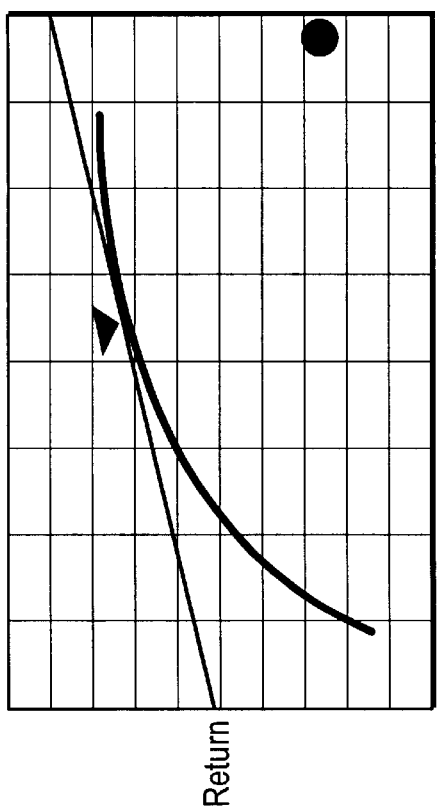
FIGS. 5A–5D depict return-to-risk charts of exemplary funds managed in accordance with the present invention.
Figure 5B:
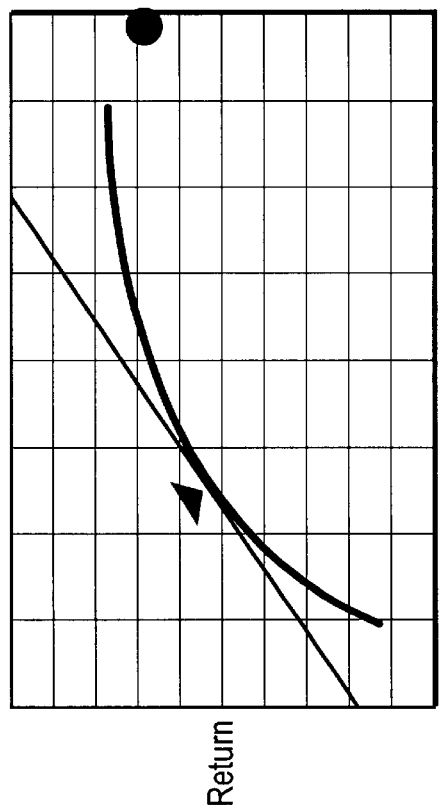
Figure 5C:
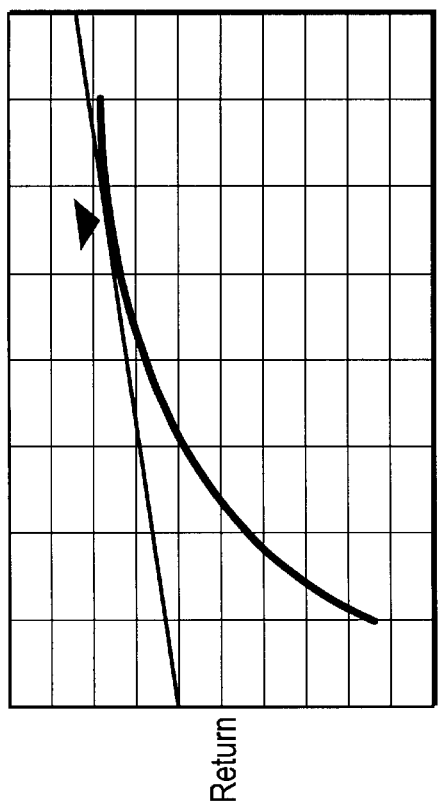
Figure 5D:
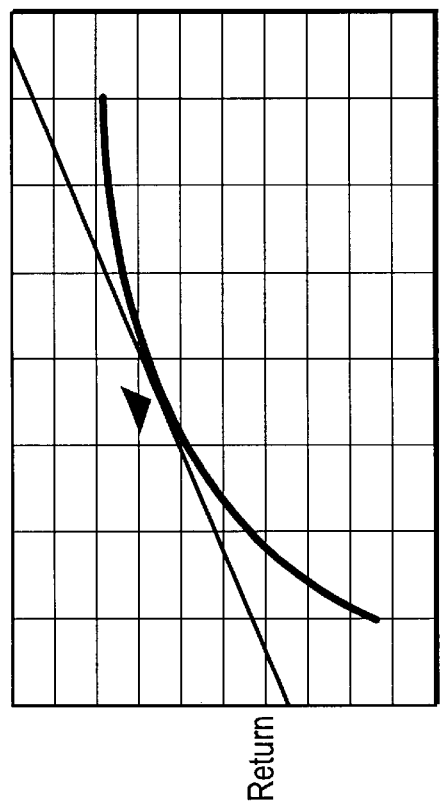

In practicing a preferred embodiment of the present invention, and as shown in FIGS. 5A–5D, once a fund $F_n$ is established, the risk tolerance $R_I$ shifts over time for that fund, without transferring any cash out of the fund. The illustrated fund $F_n$ has a time horizon $H_t$ of 40 years. In the first year, FIG. 5A, the $R_I$ is high, thus the investment mix will reflect the aggressive investment approach. Over time, as $L_H$ diminishes, the $R_I$ shifts and the fund becomes more risk averse, as illustrated in FIG. 5B. Over time, the $R_I$ for the fund $F_n$ decreases until a more conservative, or less aggressive, investment mix is achieved, as illustrated in FIGS. 5C and 5D. The $R_I$ remains fixed, i.e., conservative or aggressive, but the level shifts over the diminishing length to horizon $L_H$.

Figure 6:
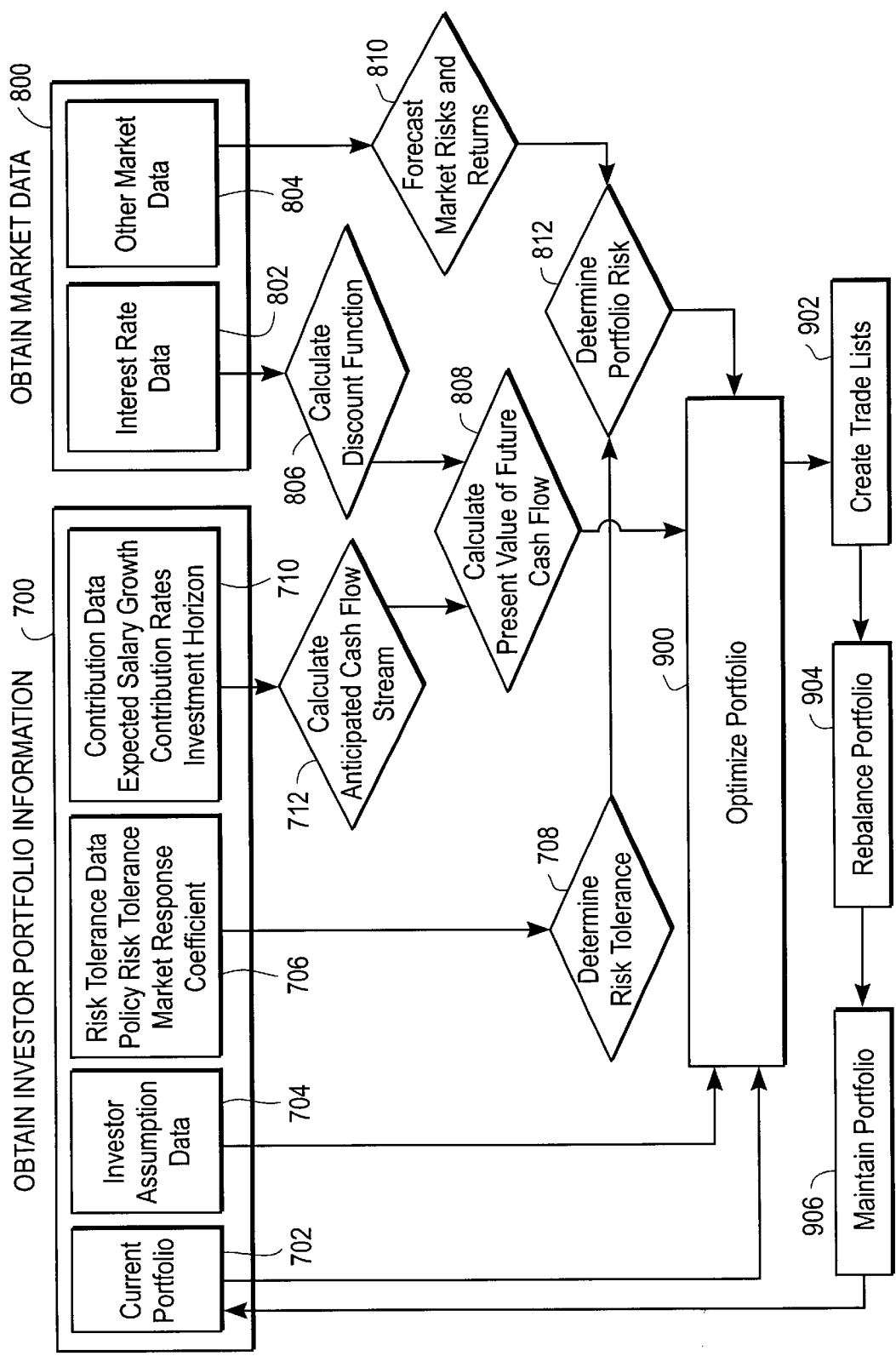
FIG. 6 depicts a flow chart of an embodiment of the present invention.

FIG. 6 depicts a general flow chart of a preferred embodiment of practicing the adjusting step 522 of the present invention. In the illustrated embodiment, information is obtained 700 from an individual investor regarding investor portfolio information and market data 800 is obtained regarding the market. The step of obtaining 700 investor portfolio information includes establishing a current portfolio 702, which becomes the repository for assets and cash. Investor assumption data may also be obtained 704.

The step of obtaining 700 investor portfolio information also includes obtaining 706 risk tolerance data. Such data includes both the investor policy risk tolerance, which typically is a measure of an aggressive/conservative investment policy on behalf of the investor, and a market response coefficient, which typically is a measure of whether the investor is generally contrary, market neutral, or insurance oriented. An investor risk tolerance $R_I$ is determined 708, which may be used in determining 812 portfolio risk, described in further detail below.

Finally, the step of obtaining 700 investor portfolio information may include obtaining 710 contribution data. That data may include such factors as the investor's current salary, expected growth rate of that salary, the investor's contribution rate, any matching funds contributed by a third source, the investment horizon $H_t$, plus any outstanding or current fund balance. Other factors may be included or omitted as appropriate for an individual investor or system. Each of these factors may be used, in combination or individually, to calculate 712 the anticipated cash flow stream for the investor.

The step of obtaining 800 market data preferably includes the steps of obtaining 802 interest rate data and obtaining 804 other market data. The step of obtaining 802 interest rate data may include calculating 806 some discount function that then may be used, in combination with the anticipated cash flow stream produced in step 712, to determine 808 the present value of future cash flow $P_{vf}$, in the form of future cash flows.

The step of obtaining 804 other market data may include determining market risk premiums, expected returns, and transaction costs associated with buying/selling portfolios and/or individual assets, which may include obtaining alphas for each portfolio and/or each asset. An alpha is defined as the difference between the investor's expected return and the observed market consensus expected return for any particular portfolio or asset. Other values may be obtained 804 as appropriate for the particular system and investors. The market data may be used to forecast 810 market risks and returns, and to determine 812 the portfolio risk.

The fund then is optimized 900 in accordance with any commercially available optimizer program or system, such as AAT, available from Scientific Press (So. San Francisco, Calif.). Inputs to an optimizer program 900 typically include a lower bound, which may be set to be that portion of the portfolio which represents the present value of all future contributions to the portfolio by the investor, or set in accordance with the investors' desired minimal exposure to an asset class or portfolio. Optimizers 900 typically also include an upper bound, which represents a maximum exposure that any investor wishes to have to one or more asset classes or portfolios. Other inputs of available optimizers typically include: asset and/or portfolio characteristics, such as expected returns, risks, and correlations; transactions costs of all types; current holdings; and investor risk tolerance. Other parameters may be considered or omitted, depending upon the particular optimizer used in conjunction with the present invention.

The present system may further include creating 902 an investor trade list. The trade list may be in the form of output from the optimizer 900, and lists the assets that need to be exchanged to obtain an optimal mix of investments. The investor portfolio may then be rebalanced 904, then maintained 906 for a specified period, such as for one month. Typically, trade lists are a necessary part of the process even when trading activity is motivated by contributions or withdrawals of cash.

While one particular embodiment of the invention has been described in detail, it will be understood that the invention may be implemented through alternative embodiments. Thus, the scope of the invention is not intended to be limited to the embodiments described above, but is to be defined by the appended claims.

What is claimed is:

1. A computer-implemented data processing method for managing a plurality of investment funds, the method implemented as a plurality of instructions in a computer readable storage medium and executable by a processor, the method comprising:

storing data representative of a plurality of investment assets, each investment asset capable of being acquired or disposed of and having a plurality of investment characteristics, each investment characteristic having a value;

storing data representative of the plurality of investment funds, each of the plurality of investment funds having a cash amount for investment in the investment fund, and a distinct, fixed time horizon $H_t$ specific to the investment fund;

associating each investment fund with a plurality of investors, each investor having a time horizon corresponding to the time horizon specific to the investment fund;

establishing an investment mix for each investment fund by selectively distributing the cash amount associated with the investment fund to selected investment assets as a function of $H_t$; and for each investment fund, periodically and without requiring participation of the investors:

determining as a function of a present date, a length of time $L_H$ remaining to the time horizon $H_t$ associated with the investment fund;

determining investor characteristics for the investment fund as a function of $L_H$; and adjusting the investment mix of the investment fund as a function of the investor characteristics for the investment fund and the investment characteristics of the investment assets.

2. The method of claim 1, further comprising, for each investment fund, the steps of:

determining a total current present value $P_{vf}$ of all future cash flows produced by each investment asset associated with the investment fund as a function of the length $L_H$;

determining a cash balance $C_B$ of the investment fund as a function of available cash in the investment fund; and storing the total current present value $P_{vf}$ and the cash balance $C_B$ in association with the investment fund.

3. The method of claim 2, wherein the step of adjusting the investment mix of each investment fund comprises:

redistributing portions of the cash balance $C_B$ associated with each investment asset associated with the investment fund as a function of the current value of at least one first investor characteristic associated with the investment fund, and at least one investment characteristic of the investment assets in the investment fund.

4. The method of claim 3, wherein at least one first investor characteristic associated with the investment fund is a risk tolerance $R_I$, the risk tolerance $R_I$ variable as a function of length $L_H$, and the at least one investment characteristic of the investment assets is a risk level of the investment asset.

5. The method of claim 4, wherein the selected investment assets associated with the investment fund remain constant during the step of adjusting the investment mix of the investment fund.

6. The method of claim 2, wherein the step of adjusting the investment mix for an investment fund comprises:

disassociating at least one first investment asset having a first investment characteristic from the investment fund according to a current value for at least one first investor characteristic; and associating at least one second investment asset having a second investment characteristic with the investment fund according to the current value of at least one first investor characteristic.

7. The method of claim 6, wherein at least one first investor characteristic associated with the investment fund is a risk tolerance $R_I$, the risk tolerance $R_I$ variable as a function of length $L_H$, and the first investment characteristic is a level of risk of the first investment asset, and the second investment characteristic is a level of risk of the second investment asset.

8. The method of claim 7, wherein the step of periodically adjusting the investment mix for the investment fund further comprises decreasing the risk tolerance $R_I$ associated with the investment fund at predetermined time intervals as a function of $L_H$.

9. The method of claim 6, further comprising:

producing a trade list indicating the first investment assets disassociated from the investment fund and the second investment assets associated with the investment fund.

10. The method of claim 6, wherein the step of adjusting the investment mix for an investment fund further comprises decreasing the risk tolerance $R_I$ associated with the investment fund at predetermined time intervals as a function of $L_H$.

11. The method of claim 2, wherein at least one first investor characteristic associated with the investment fund is a risk tolerance $R_I$, the risk tolerance $R_I$ variable as a function of length $L_H$.

12. The method of claim 1, further comprising the step of:

receiving for each investor in each investment find an input providing the cash amount associated with the investor, and storing data representative of the cash amount in association with the investment fund, such that the cash amount is selectively distributed to the selected investment assets associated with the investment fund in accordance with the investment mix.

13. The method of claim 12, wherein establishing the investment mix comprises:

selectively distributing first cash portions of the cash amount associated with the investment fund to the selected investment portfolios according to least one investor characteristic; and distributing a first cash portion associated with each investment portfolios to the investment assets associated with the investment portfolio.

14. The method of claim 1, wherein the step of storing data representative of a plurality of investment assets comprises:

storing data representative of a plurality of investment portfolios, each investment portfolio associated with at least one investment asset and having at least one portfolio characteristic having a value.

15. The method of claim 14, wherein the step of adjusting the investment mix of each investment fund comprises:

selecting ones of the investment portfolios having at least one portfolio characteristic with value that corresponds to the value of at least one first investor characteristic.

16. The method of claim 15, wherein the step of establishing an investment mix for each investment fund comprises:

distributing the cash amount associated with the investment fund between the selected investment portfolios.

17. The method of claim 14, further comprising the step of determining the portfolio characteristic as a function of the investment characteristics of the investment assets associated with the investment portfolio.

18. The method of claim 17, wherein the portfolio characteristic of an investment portfolio is a function of either:

a volatility of the investment assets associated with the investment portfolio;

a responsiveness of the investment assets to market conditions; or, an expected return on the investment assets.

19. The method of claim 15, wherein each investment portfolio is associated with investment assets of a same asset class.

20. The method of claim 1, wherein at least one investor characteristic associated with the investment fund is a geographic specification for investment assets.

21. The method of claim 1, wherein at least one investor characteristic associated with the investment fund is an industry specification for investment assets.

22. The method of claim 1, wherein at least one investor characteristic associated with the investment fund is a technology specification for investment assets.

23. The method of claim 1, wherein the investment characteristic of an investment asset includes at least one of:

a volatility of the investment asset;

a responsiveness of the investment asset to market conditions; or, an expected return on the investment asset.

24. A computer system for managing mutual funds invested in by a plurality of investors, each investor having a time horizon for his investment, comprising:

a computer readable storage medium storing data representative of a plurality of investment funds, each investment fund having:

a fixed time horizon specific to that investment fund;

a plurality of investment assets, each investment asset capable of being acquired or disposed of, the plurality of investment assets defining an investment mix which changes over time according to a diminishing length of time to the time horizon for that investment fund;

a cash amount distributed among the investment assets; and a plurality of investors, each investor having a time horizon corresponding to the time horizon for the investment fund; and a computer program product that periodically and without requiring participation of the investors updates the investment mix of each investment fund as a function of the diminishing length of time to the time horizon for that investment fund by specifying the acquisition or disposition of selected investment assets within the investment fund, or by specifying the redistribution of the cash amount among the investment assets of the investment fund, wherein the investors in each investment fund may remain associated with that investment fund over time without having to invest in a different investment fund due to changes in the investor's risk tolerance over time.

25. A computer-implemented method of providing a plurality of investment funds for a plurality of investors, each investor having a time horizon associated with investments by the investor, the method implemented as a plurality of instructions in a computer readable storage medium and executable by a processor, the method comprising:

providing a plurality of investment funds, each investment fund having a different, fixed, time horizon reflecting an expected maturity date of the investment fund;

for each investment fund, associating a plurality of the investors with the investment fund, each investor providing a cash amount for investing into the investment fund, such that each investment fund has a total cash amount associated therewith;

for each investment fund, establishing an investment mix of selected investment assets to be included in the investment fund, each investment asset capable of being acquired or disposed of, and establishing an initial allocation of the cash amount among the selected investment assets; and for each investment fund, periodically and without requiring participation of the investors adjusting the investment mix of the investment fund as a function of an amount of time remaining to the time horizon of the investment fund, by specifying the selective acquisition or disposition of investment assets for the investment fund, or by specifying a redistribution of the cash amount associated with the investment fund among the investment assets of the investment fund.

* * * * *

UNITED STATES PATENT AND TRADEMARK OFFICE
CERTIFICATE OF CORRECTION

PATENT NO.    : 6,336,102 B1                                                        Page 1 of 1
DATED         : January 1, 2002
INVENTOR(S)   : Donald L. Luskin and Lawrence G. Tint It is certified that error appears in the above-identified patent and that said Letters Patent is hereby corrected as shown below:

Column 7,
Line 67, please replace the period with -- , wherein a rate of return for the investment fund varies over time as a function of the length of time $L_H$ remaining to the time horizon $H_t$ associated with the investment fund. --

Column 10,
Line 30, please replace the period with -- and wherein a rate of return for that investment fund varies over time as a function of the diminishing length of time to the time horizon for that investment fund. --
Line 60, please replace the period with -- , wherein a rate of return for the investment fund varies over time as a function of the amount of time remaining to the time horizon of the investment fund. --

Signed and Sealed this

Twenty-third Day of December, 2003

JAMES E. ROGAN
*Director of the United States Patent and Trademark Office*